United States Patent [19]

Hirschenberger et al.

[11] Patent Number: 5,400,188
[45] Date of Patent: Mar. 21, 1995

[54] BLANK DETECTOR FOR CASSETTE TAPE PLAYER

[75] Inventors: Frank M. Hirschenberger, Belleville; John E. Whitecar, Plymouth; Nicholas L. Difiore, Farmington Hills, all of Mich.

[73] Assignee: Ford Motor Company, Dearborn, Mich.

[21] Appl. No.: 162,548

[22] Filed: Dec. 6, 1993

[51] Int. Cl.⁶ .................................................. G11B 5/09
[52] U.S. Cl. .......................................... 360/50; 360/46
[58] Field of Search ................. 360/50, 51, 53, 46, 360/72.1, 73, 13 D

[56] References Cited

U.S. PATENT DOCUMENTS

| | | | |
|---|---|---|---|
| 3,893,177 | 7/1975 | Takenaka | 360/72 |
| 4,115,821 | 9/1978 | Okada | 360/72 |
| 4,176,380 | 11/1979 | Koski et al. | 360/53 X |
| 4,198,664 | 4/1980 | Yasunaga et al. | 360/73 |
| 4,288,823 | 9/1981 | Yamamoto et al. | 360/73 |
| 4,290,090 | 9/1981 | Yamamoto et al. | 360/72.1 |
| 4,365,278 | 12/1982 | Takizawa et al. | 360/73 |
| 4,399,474 | 8/1983 | Coleman, Jr. | 360/46 |
| 4,492,990 | 1/1985 | Johnson, Jr. | 360/51 X |
| 4,564,870 | 1/1986 | Kitamura | 360/46 X |
| 4,578,721 | 3/1986 | Brannan, Jr. | 360/46 X |
| 4,680,652 | 7/1987 | Ito | 360/72.1 |
| 4,700,241 | 10/1987 | Yasuda et al. | 360/46 |
| 4,845,574 | 7/1989 | Ii et al. | 360/51 |
| 5,216,555 | 6/1993 | Siebörger et al. | 360/72.1 |
| 5,223,989 | 6/1993 | Craig et al. | 360/46 |
| 5,237,554 | 8/1993 | Shenshu et al. | 360/51 X |
| 5,241,521 | 8/1993 | Shigemori | 360/53 X |
| 5,276,666 | 1/1994 | Gunther et al. | 369/44.34 |

Primary Examiner—Donald Hajec
Assistant Examiner—Thien Minh Le
Attorney, Agent, or Firm—Mark Mollon; Roger L. May

[57] ABSTRACT

Digital signal processing (DSP) employing a differential mean calculation automatically distinguishes sections of blank tape from program material (such as music or voice) on cassette tapes. Blank tape produces a negligible differential mean value while program material produces substantial differential mean values. Thus, each differential mean is compared to a threshold so that a cassette player can be commanded to fast forward through a blank section of tape. A music envelope detector insures that low amplitude music signals are not detected as blank.

19 Claims, 2 Drawing Sheets

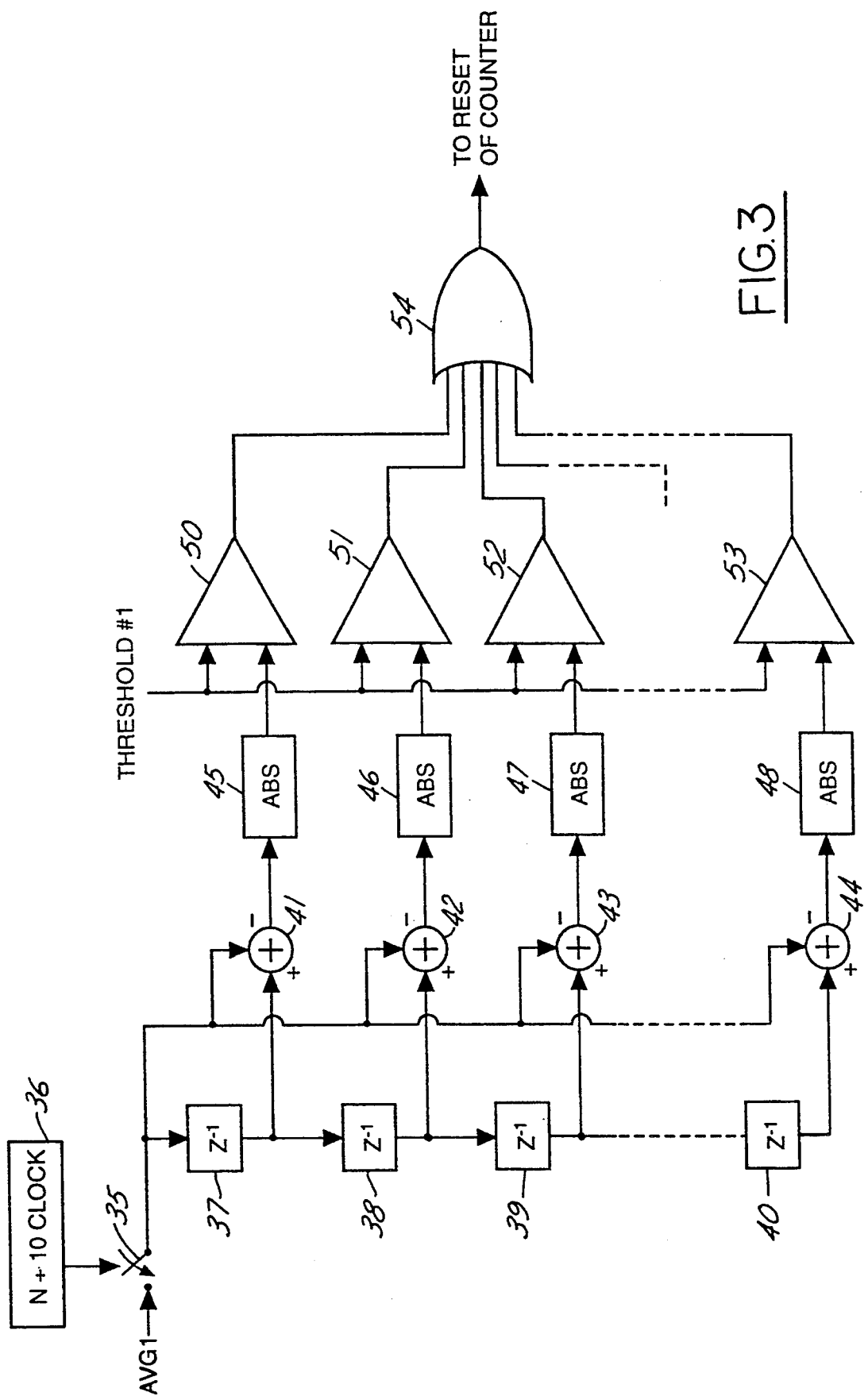

BLANK DETECTOR FOR CASSETTE TAPE PLAYER

BACKGROUND OF THE INVENTION

The present invention relates in general to cassette tape players, such as audio cassettes, and more specifically to detecting blank sections on a cassette tape not containing a recorded program information signal or to detecting blank moments in any signal medium containing gaussian noise.

Recorded cassette tapes typically contain blank unrecorded or silent sections between selections (songs) and at the end of one or both sides of the tape. The prior art attempts to detect blanks so that when a blank is encountered during playback that is longer than a predetermined period of time the cassette player automatically fast-winds the cassette tape to the end of the blank (or the end of the tape), providing a feature known as automatic blank skip. The prior art has also detected a blank versus a recorded section of the tape when in automatic music search mode, i.e., when the cassette player fast-winds through recorded sections to find the beginning of a desired selection on the tape as identified by its preceding blank.

Prior art identification of a blank is accomplished using a fixed voltage level detector. Specifically, the signal from a tape transducer head is amplified and rectified. When the absolute magnitude (peak or averaged) tape signal is less than a fixed threshold, a blank is detected. An inherent difficulty with this blank detection scheme is that a blank section of tape with a high noise floor is not detected as a blank. Further, a section of tape with a weak or low level program signal (i.e., music, voice, etc.) is detected as a blank. Because of unreliable blank detection, cassette players with automatic blank skip have required a skip control button to override inappropriate autowinding initiated during a nonblank tape section.

SUMMARY OF THE INVENTION

The present invention provides a new blank tape detector that is able to detect high noise level, unrecorded sections as blanks while detecting very low signal level program recordings as nonblank. Rather than relying on comparison of the absolute magnitude of the tape signal with a fixed threshold, the present invention relies on changes in the amplitude of the tape signal during playback.

The apparatus of the invention for detecting blank sections on recorded media comprises a transducer for recovering data signals from the recorded media. An averager averages the data signals over first and second time periods to form first and second averages. A subtractor forms the difference between the first and second averages. A comparator detects an instantaneous blank when the difference is below a predetermined threshold.

In one important embodiment of the invention, a counter counts occurrences of instantaneous blanks to form a count. The counter is reset when the comparator indicates that the difference is above the predetermined threshold. A second comparator detects a blank section when the count equals a predetermined count.

In an another important aspect of the invention, a music envelope detector is provided for detecting the presence of a recorded signal on a cassette tape when soft or low level music is present. A tape signal is sampled from the cassette tape. A plurality of average signals spanning a predetermined envelope time are generated wherein each of the average signals includes a predetermined number of samples of the tape signal. A plurality of difference signals is generated between a predetermined one of the average signals and each remaining one of the average signals. Each of the different signals is compared with a predetermined threshold, and the presence of a recorded signal is indicated if any one of the difference signals is above the predetermined threshold.

BRIEF DESCRIPTION OF THE DRAWINGS

FIG. 3 is a schematic diagram showing an envelope detector according to the present invention.

DETAILED DESCRIPTION OF THE PREFERRED EMBODIMENTS

Figure 1:
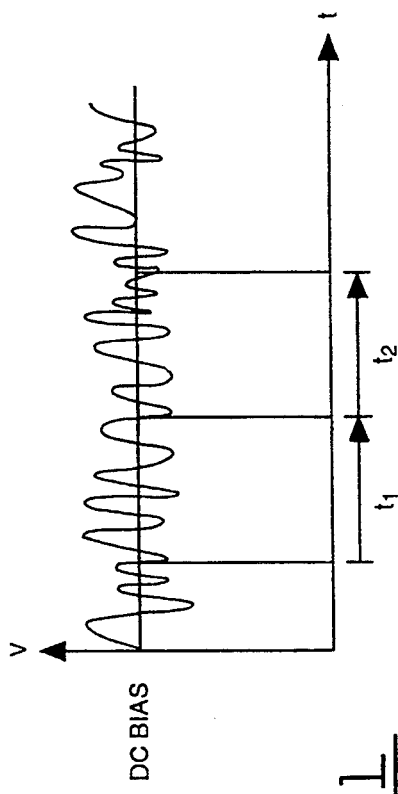
FIG. 1 is a plot showing a tape signal from a tape transducer head.

FIG. 1 represents an arbitrary tape signal derived from a magnetic head scanning a tape. The tape signal is an alternating voltage superimposed on a DC bias voltage as is known in the art. The present invention distinguishes between blank tape and recorded program material based on the time varying quality of the tape signal. Specifically, blank tape is characterized by a tape signal having an amplitude that follows a statistical Gaussian distribution. Thus, for any particular cassette tape having a blank section, the variance of the time average amplitude of the tape signal is inversely proportional to the length of time or number of samples considered in forming the average. Thus, if the time average or number of samples is increased sufficiently, the variance of the average magnitude becomes negligible for a particular cassette tape. By determining the average magnitude over a pair of time intervals $t_1$ and $t_2$ and shown in FIG. 1, a blank section of tape can be detected when the difference between the successive averages is less than a threshold. On the other hand, if the section of tape includes recorded program signals, then the successive averages of the tape signal are likely to have a difference greater than the threshold. Thus, the present invention provides a differential mean calculation to determine whether successive short segments of the tape signal indicate blank tape or recorded program material. Each averaging period is at least about 3 milliseconds long (at normal playback speed).

Preferably, the detection of blank sections via the differential mean calculation must continue over a plurality of successive time segments prior to detecting a blank section requiring fast winding of the cassette tape. For example, a continuous blank of 1 second (at normal playback speed) should be detected before taking any action. These time periods should be correspondingly reduced when operating at a fast-wind speed.

Figure 2:
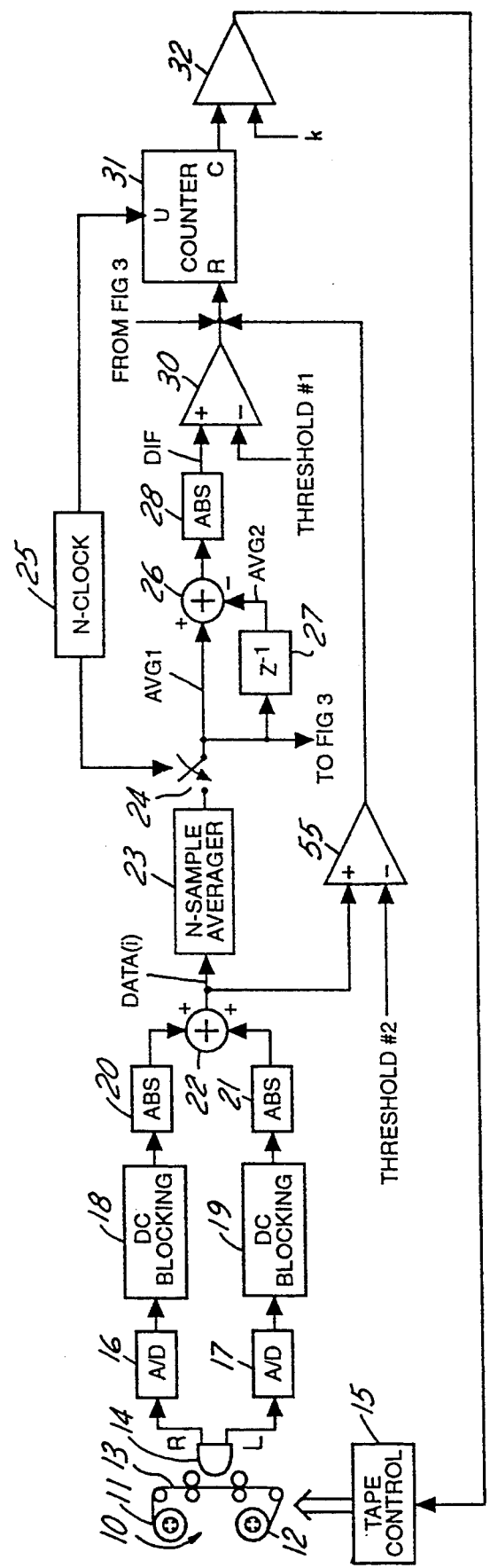
FIG. 2 is a schematic diagram of a blank detector according to the present invention.

The apparatus of the invention is shown in FIG. 2 for detecting a blank section on a cassette tape player indicated at 10. A reel 11 and a reel 12 transport a magnetic cassette tape 13 between a capstan and rollers across a transducer head 14. A tape control 15 contained in the cassette tape player controls the transport of cassette tape 13, such as reversible play, fast forward, and fast rewind, for example.

Head 14 transduces stereo signals from the cassette tape which are provided to analog-to-digital converters 16 and 17, respectively. The audio signals are preferably sampled at a rate of about 38 kHz. For this blank detection system, it has been found acceptable to use only half the incoming samples, giving an effective sample rate of 19 kHz. The digitized signals are coupled to DC blocking filters 18 and 19 for removing the DC error added to the signals by the A/D converters. Samples from DC blocking filters 18 and 19 are passed through absolute value blocks 20 and 21, respectively, for forming the absolute magnitude of the tape signals. Samples from absolute value blocks 20 and 21 are added in a summer 22 producing a plurality of samples DATA(i) corresponding to the instantaneous absolute magnitude of the recorded signal level on the cassette tape at a plurality of sample times (i=1, 2, 3, ... ).

The data samples DATA(i) are provided to the input of an N-sample averager 23 which calculates the average value of the most recent N-samples, wherein N provides an averaging period that is sufficient to minimize the variance of Gaussian noise present in blank sections of the tape. Applicants have successfully employed a value of N of 64 in conjunction with a sample rate of 19 kHz.

A sampler 24 is connected to the output of N-sample averager 23 and to an N-sample clock 25 (which has a clock frequency of 19 kHz divided by N) for extracting the output of N-sampler average 23 after each N samples to produce an average value AVG1. Signal AVG1 is provided to one input of a summer 26 and to the input of a unit delay block 27. The output of unit delay block 27 is connected to a subtracting input of summer 26 and constitutes a previous time average AVG2. The difference between successive averages is provided from summer 26 to an absolute value block 28. The absolute value of the difference comprises a DIF signal which is coupled to one input of a comparator 30. The other input of comparator 30 receives a signal corresponding to a threshold #1. Thus, the output of comparator 30 indicates whether an instantaneous blank is present between the successive average signals AVG1 and AVG2.

The output of comparator 30 is connected to the RESET input of a UP/DOWN counter 31 that receives the N-sample clock output signal at its UP input. The COUNT output of UP/DOWN counter 31 is connected to a input of a comparator 32. Comparator 32 receives a constant k at its other input. Comparator 32 compares the count from counter 34 with constant k and generates an output signal when the count exceeds k. UP/DOWN counter 31 counts upward for as long as instantaneous blank sections of tape are detected. When a nonblank is indicated by comparator 30, counter 31 is reset and the count returns to zero. When the count of successive instantaneous blanks reaches a predetermined count defined by constant k, a blank section of tape is indicated and an output signal is provided from comparator 32 to tape control 15, whereby a fast wind operation can be instituted to skip the blank section of tape (or to stop a fast-wind operation during automatic music search). A value of k of about 5938 (for N=64) is preferred, such that a continuous blank of 20 seconds or more is detected.

In operation, the blank detector of FIG. 2 samples right and left audio signals to generate an R(i) signal and an L(i) signal, respectively, where i is a sample number.

A tape level signal DATA(i) is formed according to the formula:

$$DATA(i) = |R(i) - R_{DC}| + |L(i) - L_{DC}|$$

where $R_{DC}$ and $L_{DC}$ are DC offset values for R(i) and L(i) signals, respectively. A first average level tape signal AVG1 is formed over a first time period according to the formula:

$$AVG1 = \frac{1}{N} \cdot \sum_{i=1}^{N} DATA(i)$$

where N is a whole number of samples coinciding with the first time period. A second average tape level signal AVG2 is formed over a second time period according to the formula:

$$AVG2 = \frac{1}{M} \cdot \sum_{i=N+1}^{N+M} DATA(i)$$

where M is a whole number of samples coinciding with the second time period. Preferably, M is equal to N for simplification of the device. When M equals N, the formula for average tape level signal AVG2 becomes:

$$AVG2 = \frac{1}{N} \cdot \sum_{i=N+1}^{2N} DATA(i)$$

A different signal DIF is formed according to the formula:

$$DIF = |AVG1 - AVG2|$$

Finally, an instantaneous blank is detected when DIF is less than a threshold.

The functional blocks in FIG. 2 from DC blocking filters 18 and 19 through comparator 32 are preferably implemented using digital signal processing (DSP) techniques. In a preferred embodiment using 16-bit DSP representation of signals, threshold #1 was selected to be 15/32768, where 32767/32768 is the highest representable value of the DSP signal.

The blank tape detector described thus far in FIG. 2 provides excellent detection of blank tape versus program material. However, in some instances recorded music may be delicate and slow moving, thereby producing differential mean values that are small. In order to improve blank detection performance in the presence of such music of low dynamicity, the present invention provides a music envelope detector as shown in FIG. 3.

The music envelope detector receives AVG1 samples from sampler 24 in FIG. 2. The AVG1 samples are provided to a sampler 35 connected to a N÷10 clock 36. Thus, each tenth sample of AVG1 is processed in the music envelope detector. The AVG1 samples are input to a plurality of unit delays 37–40 connected as a serial delay line and to the subtracting input of a plurality of summers 41–44. Preferably about fifty unit delays and summers are provided, although only four are shown in the drawing. Thus, the series of averages contained in unit delays 37–40 span an envelope time of about 1.6 seconds.

Each summer 41–44 includes an adding input receiving a delayed AVG1 sample from a respective unit delay 37–40. Thus, each summer 41–44 outputs a respective difference between the most recent sample AVG1 and a respective one of the series of AVG1 samples present in the delay line formed by unit delays 37–40. Each respective difference is converted to an absolute value in a respective absolute value block 45–48. Each absolute value is compared to threshold #1 in a respective comparator 50–53. The value of threshold #1 is preferable the same as that employed in FIG. 2, although a different value can be employed. Using DSP techniques, the comparison function of comparators 50–53 can easily be implemented by subtracting the value of threshold #1 from each respective absolute valued sample and comparing the result with zero.

The outputs of comparators 50–53 are coupled to respective inputs of an OR gate 54. Thus, if the result of any comparison indicates that the absolute valued difference of any respective pair of samples exceeds threshold #1, then a RESET signal is provided from OR gate 54 to the RESET input of counter 31 in FIG. 2.

Returning to FIG. 2, a further improvement to blank tape detection is obtained using an additional comparator 55 to detect the presence of certain recorded signals. A type of recorded signal that would have a low differential mean calculation is a signal possessing a Fourier transform which is time invariant. For example, a test signal having constant frequency and amplitude would appear as a blank tape section to the differential mean detector. Therefore, each input DATA(i) sample is compared to a threshold #2 in comparator 55. Threshold #2 is a value greater than threshold #1 and is similar to values employed in the prior art which relied only on amplitude comparisons for detecting blank tape. The output of comparator 55 is connected to the RESET input of UP/DOWN counter 34 for resetting the count when a high amplitude signal is detected from the cassette tape.

The fundamental technique of the invention is to detect a tape blank in the absence of a signal in a gaussian noise channel. This detection scheme can be applied to detection of the absence of a signal in many other applications since almost any information bearing signal will have a differential mean value different from that associated with the gaussian noise otherwise in that channel. For example, in telecommunications equipment such as speakerphones operating in half duplex, it is necessary to detect a break in the incoming voice signal in order to recapture the line to allow the local party to speak. The invention is also useful for detecting quiet times in broadcasted radios signals.

What is claimed is:

1. Apparatus for detecting the absence of information in a channel used to carry an information signal comprising:
    an averager for averaging said channel signals over a first and a second time period to form first and second averages, said first and second time periods having respective lengths minimizing the variance in mean Gaussian noise without minimizing the variance corresponding to said information signal;
    a subtractor for forming a difference between said first and second averages; and
    a first comparator for detecting said absence of information when said difference is below a predetermined threshold.

2. The apparatus of claim 1 further comprising:
    a counter for counting occurrences of the detection of said absence of information to form a count, said counter being reset when said first comparator indicates that said difference is above said predetermined threshold; and
    a second comparator for detecting a blank when said count equals a predetermined count.

3. The apparatus of claim 2 further comprising envelope detector means coupled to said averager and said counter for forming a series of said averages spanning an envelope time, for forming each difference between each average of said series with a predetermined one of said series, and for resetting said counter if any one of said differences is above said predetermined threshold.

4. The apparatus of claim 2 further comprising magnitude means for resetting said counter if one of said averages has a magnitude greater than a predetermined magnitude.

5. The apparatus of claim 1 wherein said first and second time periods are substantially consecutive and substantially equal in duration.

6. The apparatus of claim 1 wherein said first and second time periods are each about 3 milliseconds.

7. The apparatus of claim 1 wherein said channel signal includes stereo audio signals.

8. The apparatus of claim 7 further including a summer coupled to said averager for summing said stereo audio signals.

9. The apparatus of claim 1 further comprising:
    a transport mechanism for fast advancing tape media in a cassette tape player relative to a tape transducer while said blank continues being detected.

10. An audio cassette player comprising:
    a multi-channel cassette tape deck for reproducing first and second audio signals from a cassette tape;
    an analog-to-digital converter digitizing said first and second audio signals;
    a first summer receiving said first and second audio signals to produce a sum signal;
    an N-sample averager periodically generating average signals over N samples of said sum signal;
    a delay block for delaying one of said average signals;
    a second summer receiving an average signal from said N-sample averager and a delayed average signal from said delay block to produce a difference signal; and
    a first comparator responsive to said difference signal and a predetermined threshold for detecting an instantaneous blank on said cassette tape.

11. The audio cassette player of claim 10 further comprising an absolute value block obtaining the absolute value of said difference signal and providing said absolute value to said first comparator.

12. The audio cassette player of claim 10 further comprising:
    a counter for incrementing on each occurrence of an instantaneous blank to form a count, said counter being reset when an instantaneous blank is not detected; and
    a second comparator for detecting a blank section when said count equals a predetermined count.

13. The apparatus of claim 12 further comprising envelope detector means coupled to said N-sample averager and said counter for forming a series of averages spanning an envelope time, for forming each difference between each average of said series with a predetermined one of said series, and for resetting said counter if any one of said differences is above said predetermined threshold.

14. The audio cassette player of claim 12 wherein said first and second summers, said N-sample averager, said delay block, said first and second comparators, and said counter are implemented using digital signal processing.

15. The audio cassette player of claim 10 further comprising a DC rejection filter removing a DC component from at least one of said first and second audio signals prior to summing in said first summer.

16. The audio cassette player of claim 10 further comprising an absolute value block forming the absolute value of at least one of said first and second audio signals prior to summing in said first summer.

17. The audio cassette player of claim 12 further comprising a control coupled to said counter and said cassette tape deck for controlling a fast wind operation of said cassette tape deck in response to said detection of a blank section.

18. A method for detecting a blank on a cassette tape reproducing right and left stereo audio signals, said method comprising the steps of:

sampling said right audio signal to generate an $R(i)$ signal, where $i$ is a sample number;

sampling said left audio signal to generate an $L(i)$ signal;

forming a tape level signal $DATA(i)$ according to the formula $$DATA(i) = |R(i) - R_{DC}| + |L(i) - L_{DC}|$$

where $R_{DC}$ and $L_{DC}$ are DC offset values for said $R(i)$ and $L(i)$ signals, respectively;

forming a first average tape level signal AVG1 over a first time period according to the formula $$AVG1 = \frac{1}{N} \cdot \sum_{i=1}^{N} DATA(i)$$

where N is a whole number of samples coinciding with said first time period;

forming a second average tape level signal AVG2 over a second time period according to the formula $$AVG2 = \frac{1}{M} \cdot \sum_{i=N+1}^{N+M} DATA(i)$$

where M is a whole number of samples coinciding with said second time period;

forming a difference signal DIF according to the formula $$DIF = |AVG1 - AVG2|$$

and;

detecting said blank when DIF is less than a threshold.

19. A method for detecting the presence of a recorded signal on a cassette tape comprising the steps of:

sampling a tape signal from said cassette tape:

generating a plurality of average signals spanning a predetermined envelope time, each of said average signals including a predetermined number of samples of said tape signal;

generating a plurality of difference signals between a predetermined one of said average signals and each remaining one of said average signals;

comparing each of said difference signals with a predetermined threshold; and indicating the presence of a recorded signal if any one of said difference signals is above said predetermined threshold.

* * * * *